(12) United States Patent
Guo et al.

(10) Patent No.: US 10,731,667 B2
(45) Date of Patent: Aug. 4, 2020

(54) REAR GRILL ASSEMBLY FOR BOX FAN

(71) Applicants: GD MIDEA ENVIRONMENT APPLIANCES MFG CO., LTD., Zhongshan (CN); MIDEA GROUP CO., LTD., Foshan (CN)

(72) Inventors: Runming Guo, Zhongshan (CN); Weiliang Liu, Zhongshan (CN); Fengxi Yan, Zhongshan (CN); Xusheng Zhang, Zhongshan (CN); Meihua Deng, Zhongshan (CN)

(*) Notice: Subject to any disclaimer, the term of this patent is extended or adjusted under 35 U.S.C. 154(b) by 8 days.

(21) Appl. No.: 15/748,627

(22) PCT Filed: Nov. 29, 2016

(86) PCT No.: PCT/CN2016/107587
§ 371 (c)(1),
(2) Date: Jan. 29, 2018

(87) PCT Pub. No.: WO2017/107743
PCT Pub. Date: Jun. 29, 2017

(65) Prior Publication Data
US 2019/0003489 A1    Jan. 3, 2019

(30) Foreign Application Priority Data
Dec. 24, 2015 (CN) .................. 2015 2 11046460 U

(51) Int. Cl.
*F04D 29/64* (2006.01)
*F04D 25/08* (2006.01)
(Continued)

(52) U.S. Cl.
CPC .......... *F04D 29/644* (2013.01); *F04D 25/06* (2013.01); *F04D 25/08* (2013.01); *F04D 29/522* (2013.01);
(Continued)

(58) Field of Classification Search
CPC ........ F04D 25/08; F04D 29/403; F04D 29/52; F04D 29/522; F04D 29/644;
(Continued)

(56) References Cited

U.S. PATENT DOCUMENTS 6,227,822 B1 * 5/2001 Chen ...................... F04D 25/08
                                                                    310/63
6,309,192 B1    10/2001 Litvin
(Continued)

FOREIGN PATENT DOCUMENTS

CN            2826037 Y    10/2006
CN          101096969 A     1/2008
(Continued)

*Primary Examiner* — Philip E Stimpert
(74) *Attorney, Agent, or Firm* — Kilpatrick Townsend & Stockton, LLP

(57) ABSTRACT

Disclosed is a rear grill assembly for a box fan including a rear grill, an electric motor support positioned on the rear grill by a positioning structure, and a frame arranged on the periphery of the rear grill by a snap structure. The frame includes a bottom cover, a top cover, and two side boards connected between the bottom cover and the top cover. The electric motor support is positioned on the rear grill by the positioning structure so that the electric motor support can be mounted easily and firmly. Thus, shortening the time for mounting the motor support, and improving the efficiency for mounting the rear grill assembly. Moreover, since the bottom cover, the top cover and the two side boards are assembled to form a frame, each part can be produced separately, whereby the difficulty in producing the frame is decreased to a certain extent.

9 Claims, 5 Drawing Sheets

(51) Int. Cl.
*F04D 29/52* (2006.01)
*F04D 25/06* (2006.01)
*F04D 29/70* (2006.01)
*F04D 19/00* (2006.01)
*H02K 5/136* (2006.01)

(52) U.S. Cl.
CPC ......... *F04D 29/526* (2013.01); *F04D 29/646* (2013.01); *F04D 29/703* (2013.01); *H02K 5/136* (2013.01); *F04D 19/002* (2013.01)

(58) Field of Classification Search
CPC ...... F04D 19/002; F04D 25/06; F04D 29/646; F04D 29/703; H02K 5/136
See application file for complete search history.

(56) References Cited

U.S. PATENT DOCUMENTS

| | | | | |
|---|---|---|---|---|
| 2013/0051999 | A1* | 2/2013 | Wenger | F04D 25/08 415/200 |
| 2013/0239605 | A1* | 9/2013 | Oh | F04D 25/08 62/428 |

FOREIGN PATENT DOCUMENTS

| | | | |
|---|---|---|---|
| CN | 201546992 U | * | 8/2010 |
| CN | 201546992 U | | 8/2010 |
| CN | 204755350 U | | 11/2015 |
| CN | 105402166 A | | 3/2016 |
| CN | 205190351 U | | 4/2016 |
| CN | 205298087 U | | 6/2016 |

* cited by examiner

REAR GRILL ASSEMBLY FOR BOX FAN

CROSS-REFERENCE TO RELATED APPLICATION

This application is a national phase entry under 35 USC § 371 of International Application PCT/CN2016/107587, filed Nov. 29, 2016, which claims priority to and benefits of Chinese Patent Applications Serial No. 201521104646.0, filed with the State Intellectual Property Office of P. R. China on Dec. 24, 2015, the entire contents of which are incorporated herein by reference.

FIELD

The present disclosure relates to a technical field of box fans, and more particularly to a rear grill assembly for a box fan.

BACKGROUND

In the related art, an outer frame of a box fan is usually a metal outer frame, and an electric motor support is directly welded to the metal frame. The metal frame is mostly formed of two outer frames of metal materials by means of welding. A rear grill needs to be fixedly connected to the metal frame through ten or more screws.

Thus, there are the following disadvantages existing in the traditional box fan: 1. It is not convenient to weld the electric motor support to the frame, and efficiency of the welding is extremely low; 2. A machining process for the metal outer frame is complicated, and the manufacturability is low; 3. The outer frame structure of metal materials needs to be separately provided with a connecting member to fix an electric component, such that the number of parts is large; 4. An electric motor must be connected to the electric motor support through an adapter, and a screw hole of a metal part additionally needs a tapping process, which results in inconvenient production and processing.

SUMMARY

Embodiments of the present disclosure seek to solve at least one of the problems existing in the prior art to at least some extent. In one embodiment, a rear grill assembly for a box fan, the rear grill assembly has a simple structure, and an electric motor support is convenient to mount and high in efficiency is described.

The rear grill assembly for the box fan according to the present disclosure includes: a rear grill; an electric motor support located on the rear grill through a positioning structure; and a frame arranged at a peripheral edge of the rear grill through a snap structure, and including a bottom cover, a top cover and two lateral plates connected between the bottom cover and the top cover.

For the rear grill assembly for the box fan according to the present disclosure, the electric motor support is located on the rear grill through the positioning structure, such that the electric motor support can be mounted simply and firmly, and the time for installation of the electric motor support can also be shortened, thereby improving the efficiency of installation of the rear grill assembly at least to a certain extent. Moreover the bottom cover, the top cover and the two lateral plates are assembled to form the frame, and the components each can be manufactured and produced separately, thereby reducing the difficulty of production of the frame at least to a certain extent. In addition, the frame is arranged at the peripheral edge of the rear grill through the snap structure, such that the installation between the frame and the rear grill is simple and reliable, and the time for mounting the frame to the rear grill is shortened, thereby improving the efficiency of installation of the rear grill assembly.

In addition, the rear grill assembly for the box fan according to the present disclosure can also have the following distinguished technical features:

In some examples of the present disclosure, the electric motor support includes: a plurality of support bodies in the shape of a strip, each support body is located with respect to the rear grill through the positioning structure.

In some examples of the present disclosure, two support bodies are provided and arranged in parallel to each other, each support body extends upwards to an upper edge of the rear grill and downwards to a lower edge of the rear grill, an electric motor of the box fan is configured to be fixed between the two support bodies.

In some examples of the present disclosure, the rear grill assembly includes an electric motor fireproof hood, the electric motor fireproof hood is fixed to the electric motor support, and the electric motor of the box fan is configured to be disposed in the electric motor fireproof hood.

In some examples of the present disclosure, positioning structures are spaced from each other in a length direction of the electric motor support, and each positioning structure includes a positioning hole and a positioning pillar which are fitted with each other.

In some examples of the present disclosure, a rear edge of the bottom cover is provided with a bottom-cover rear edge snap connecting portion, and the rear grill is provided with a first rear-grill snap connecting portion snap-fitted with the bottom-cover rear edge snap connecting portion.

In some examples of the present disclosure, an end portion of each lateral plate is provided with a lateral-plate end snap connecting portion, and a rear side edge of each lateral plate is provided with a lateral-plate rear edge snap connecting portion; each of two end portions of the bottom cover is provided with a bottom-cover end snap connecting portion, and the bottom-cover end snap connecting portion is snap-fitted with the corresponding lateral-plate end snap connecting portion; and the rear grill is provided with a second rear-grill snap connecting portion, and the second rear-grill snap connecting portion is snap-fitted with the lateral-plate rear edge snap connecting portion.

In some examples of the present disclosure, a rear edge of the top cover is provided with a top-cover rear edge snap connecting portion, an end portion of the top cover is provided with a top-cover end snap connecting portion, the rear grill is provided with a third rear-grill snap connecting portion, the third rear-grill snap connecting portion is snap-fitted with the top-cover rear edge snap connecting portion, and the top-cover end snap connecting portion is snap-fitted with the corresponding lateral-plate end snap connecting portion.

In some examples of the present disclosure, the electric motor support is a metal part, and the rear grill and the frame both are a plastic part.

In some examples of the present disclosure, the top cover and/or the bottom cover is provided with a limiting plate, and the end portion of the electric motor support extends into a rear of the limiting plate, each of the limiting plate and the electric motor support is provided with a threaded hole, a screw in the rear grill assembly passes through threaded holes of the limiting plate and the electric motor support.

Figure 1:
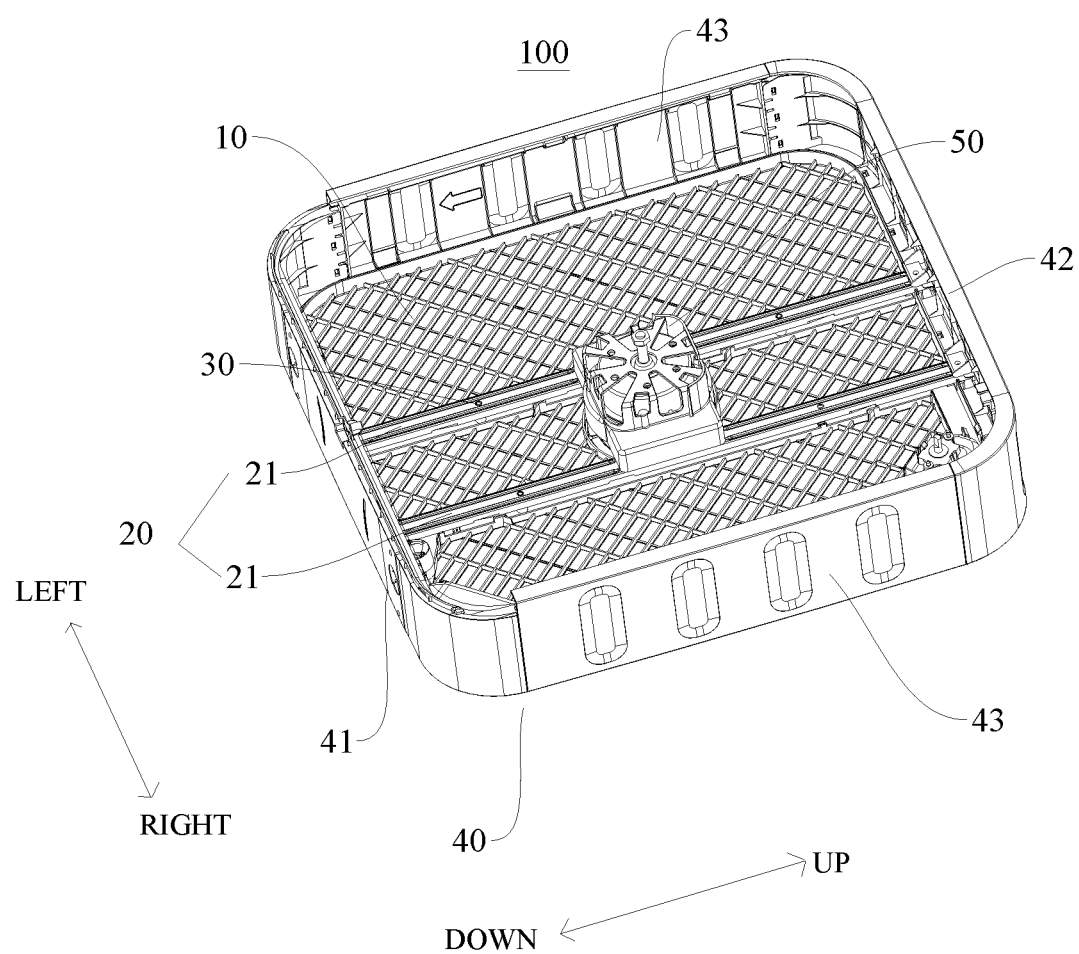
FIG. 1 is a schematic view of a rear grill assembly for a box fan according to embodiments of the present disclosure.

REFERENCE NUMERALS rear grill assembly 100;

rear grill 10; first rear-grill snap connecting portion 11; second rear-grill snap connecting portion 12; third rear-grill snap connecting portion 13;

electric motor support 20; support body 21;

positioning structure 30; positioning hole 31; positioning pillar 32;

frame 40; bottom cover 41; bottom-cover rear edge snap connecting portion 41a; bottom-cover end snap connecting portion 41b;

top cover 42; top-cover end snap connecting portion 42a;

lateral plate 43; lateral-plate end snap connecting portion 43a; lateral-plate rear edge snap connecting portion 43b;

electric motor fireproof hood 50; electric motor 60.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the term "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed there between. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

A rear grill assembly 100 for a box fan according to embodiments of the present disclosure will be described below in detail with reference to the drawings.

The rear grill assembly 100 for the box fan according to embodiments of the present disclosure can include: a rear grill 10, an electric motor support 20 and a frame 40. The electric motor support 20 is located on the rear grill 10 through a positioning structure 30. Therefore, the way by which the electric motor support 20 is mounted to the rear grill 10 can be different from a way in the prior art that the electric motor support is directly welded to the frame. Installation of the electric motor support 20 that is mounted by means of the above way is simple and firm, and the time for installation of the electric motor support 20 can also be shortened, thereby improving the installation efficiency of the rear grill assembly 100 at least to a certain extent.

According to an embodiment of the present disclosure, as shown in FIGS. 1-5, the electric motor support 20 can include a plurality of shaped support bodies 21 in the shape of a strip. Each support body 21 can be located with respect to the rear grill 10 through the positioning structure 30. Thus, when an electric motor 60 is mounted to the electric motor support 20, the electric motor 60 can be connected with the plurality of support bodies 21 at the same time, and the plurality of support bodies 21 can be located on the rear grill 10 through the positioning structure 30, thereby improving reliability of the electric motor 60 that is mounted to the rear grill 10, and improving the structural strength of the rear grill assembly 100. The support body 21 in the shape of a strip can facilitate the arrangement of the positioning structure 30.

In one embodiment, two support bodies 21 can be provided and the two support bodies 21 are arranged in parallel to each other. Each support body 21 extends upwards to an upper edge of the rear grill 10 and downwards to a lower edge of the rear grill 10. The electric motor 60 of the box fan is configured to be fixed between the two support bodies 21. It should be understood that, length of each support body 21 can approximate to or be equal to length of the rear grill 10 in the up-down direction, such that a contacting area between each support body 21 and the rear grill 10 can be effectively increased, and a plurality of positioning structures 30 can also be conveniently spaced apart from each other in the length direction of the support body 21, thereby facilitating the arrangement of the positioning structures 30 at least to a certain extent, and improving the reliability of the electric motor 60 and the electric motor support 20 that are mounted to the rear grill 10.

Figure 2:
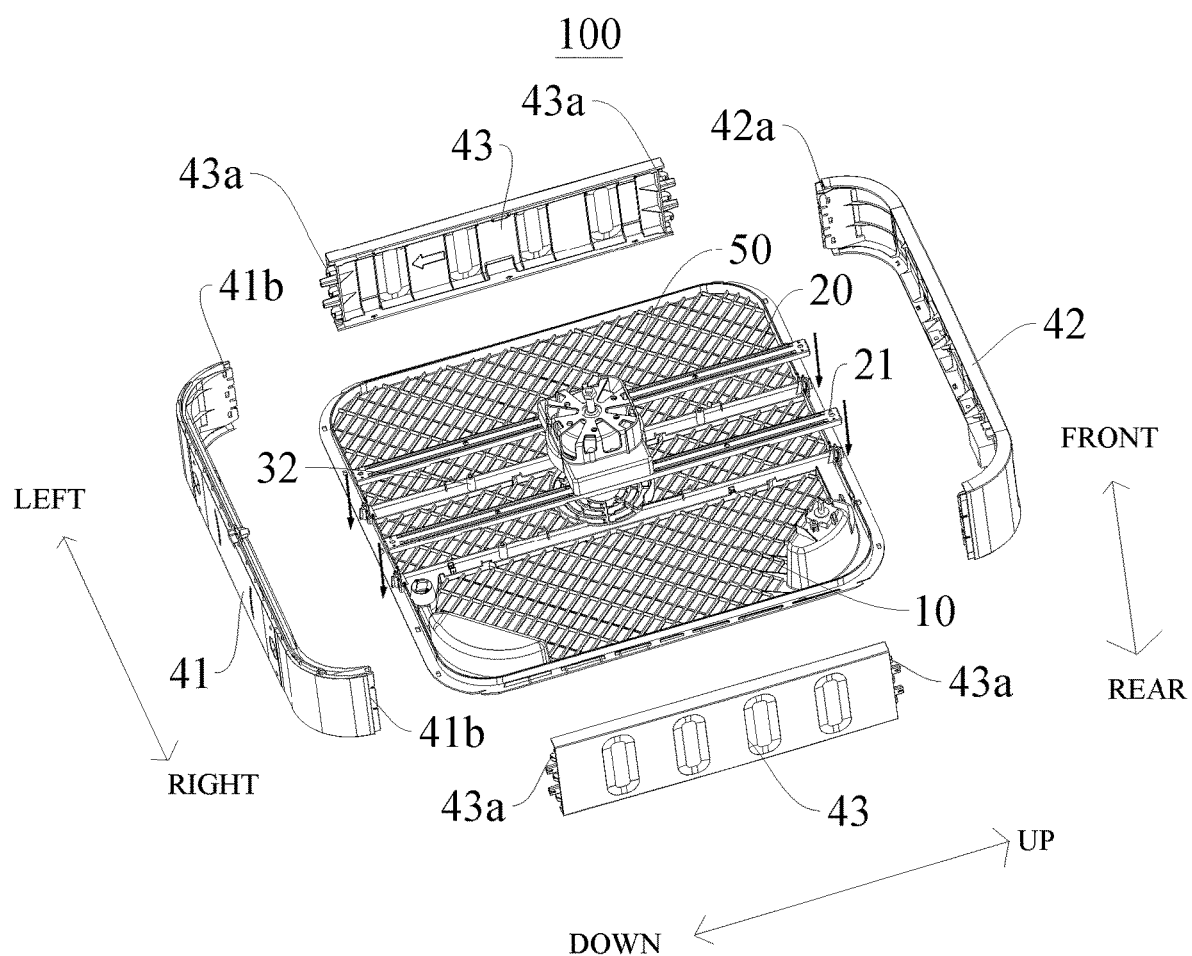
FIG. 2 is an exploded view of a rear grill assembly for a box fan according to embodiments of the present disclosure.
Figure 3:
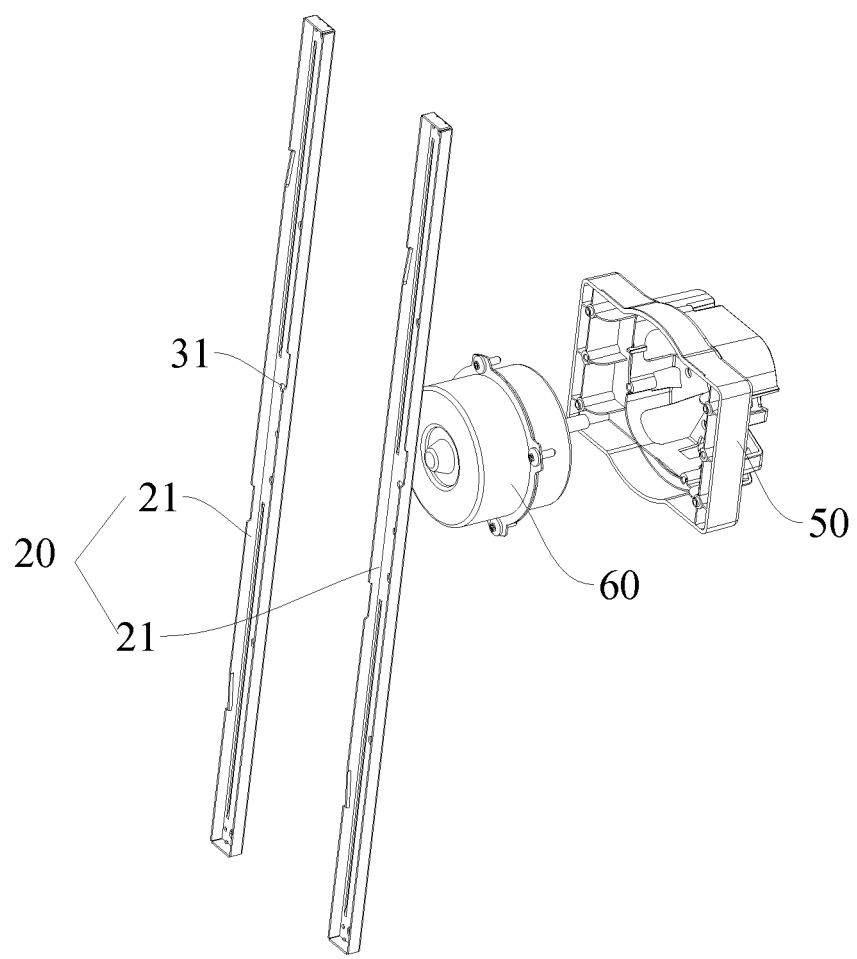
FIG. 3 is a schematic view of an electric motor, an electric motor fireproof hood and an electric motor support for the rear grill assembly for the box fan in FIG. 2.

According to one embodiment, as shown in FIGS. 2 and 3, the rear grill assembly 100 can also include an electric motor fireproof hood 50. The electric motor fireproof hood 50 is fixed to the electric motor support 20, and the electric motor 60 of the box fan is configured to be disposed in the electric motor fireproof hood 50. It should be understood that, by providing the electric motor fireproof hood 50, operation safety of the electric motor 60 can be effectively improved, moreover the electric motor 60 can be mounted to the electric motor support 20 through the electric motor fireproof hood 50, thereby improving the installation reliability of the electric motor 60.

Figure 4:
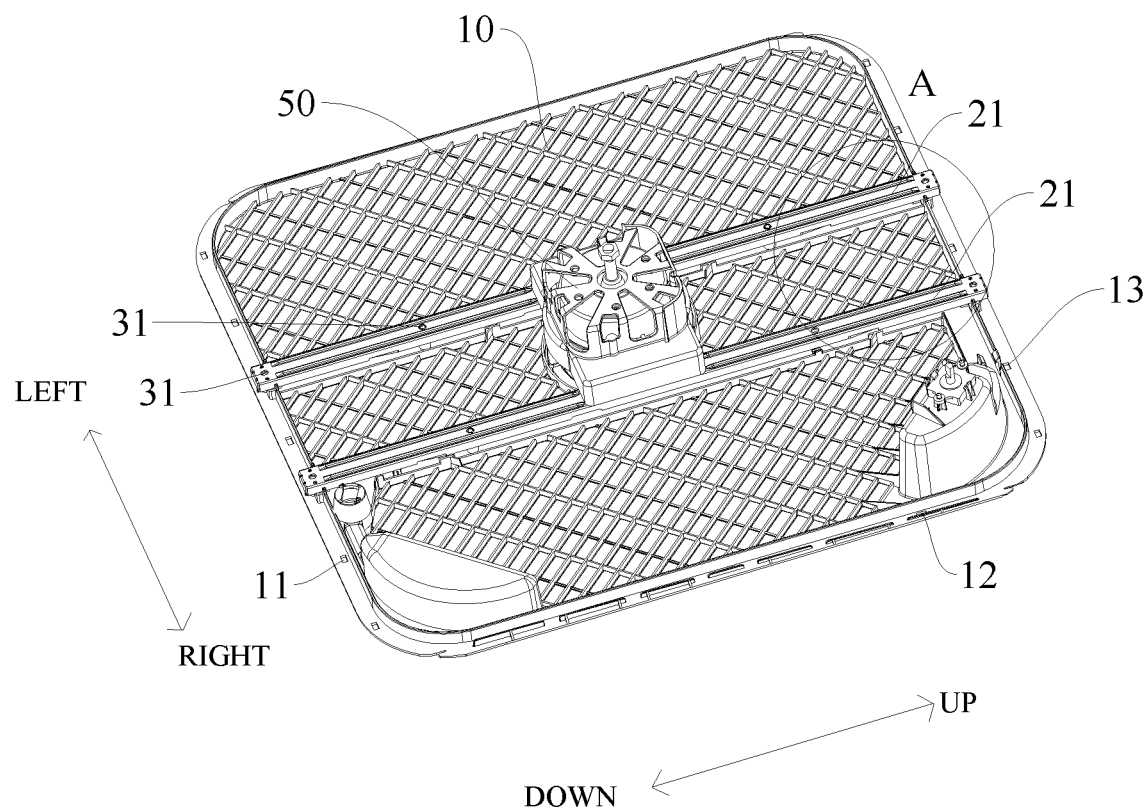
FIG. 4 is a schematic view of a rear grill provided with an electric motor support.
Figure 5:
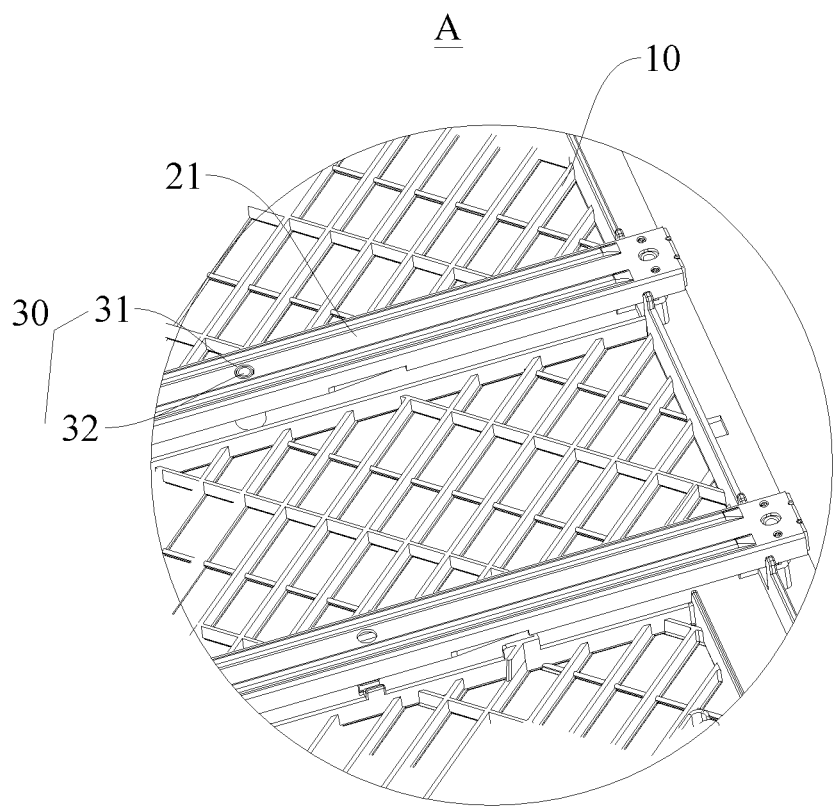
FIG. 5 is an enlarged view of an area A in FIG. 4.

In one embodiment, with reference to FIGS. 3-5, the positioning structures 30 can be spaced from each other in the length direction (the up-down direction shown in FIG. 4) of the electric motor support 20, and the positioning structure 30 can include a positioning hole 31 and a positioning pillar 32 which are fitted with each other. As shown in FIG. 5, the positioning hole 31 is defined in the support body 21 of the electric motor support 20, and the positioning pillar 32 is arranged on the rear grill 10. A plurality of positioning holes 31 and a plurality of positioning pillars 32 can be provided, the plurality of positioning holes 31 are corresponding to the plurality of positioning pillars 32 one to one, thereby further improving the reliability of the electric motor 60 and the electric motor support 20 that are mounted to the rear grill 10.

With reference to FIGS. 1 and 2, the frame 40 can be arranged at a peripheral edge of the rear grill 10 through a snap structure, and the frame 40 includes a bottom cover 41, a top cover 42 and two lateral plates 43 connected between the bottom cover 41 and the top cover 42. Thus, the bottom cover 41, the top cover 42 and the two lateral plates 43 are assembled to form the frame 40, and the above each component can be manufactured and produced separately, thereby reducing the difficulty of production of the frame 40 at least to a certain extent. In addition, the frame 40 is arranged at the peripheral edge of the rear grill 10 through the snap structure, such that the installation between the frame 40 and the rear grill 10 is simple and reliable, and the time for mounting the frame 40 to the rear grill 10 is shortened, thereby improving the efficiency of installation of the rear grill assembly 100.

For the rear grill assembly 100 for the box fan according to embodiments of the present disclosure, the electric motor support 20 is located on the rear grill 10 through the positioning structures 30, such that the electric motor support 20 can be mounted simply and firmly, and time for installation of the electric motor support 20 can also be shortened, thereby improving the efficiency of installation of the rear grill assembly 100 at least to a certain extent. Moreover, the bottom cover 41, the top cover 42 and the two lateral plates 43 are assembled to form the frame 40, and the each component can be manufactured and produced separately, thereby reducing the difficulty of production of the frame 40 at least to a certain extent. In addition, the frame 40 is arranged at the peripheral edge of the rear grill 10 through the snap structure, such that the installation between the frame 40 and the rear grill 10 is simple and reliable, and the time for mounting the frame 40 to the rear grill 10 is shortened, thereby improving the efficiency of installation of the rear grill assembly 100.

Figure 6:
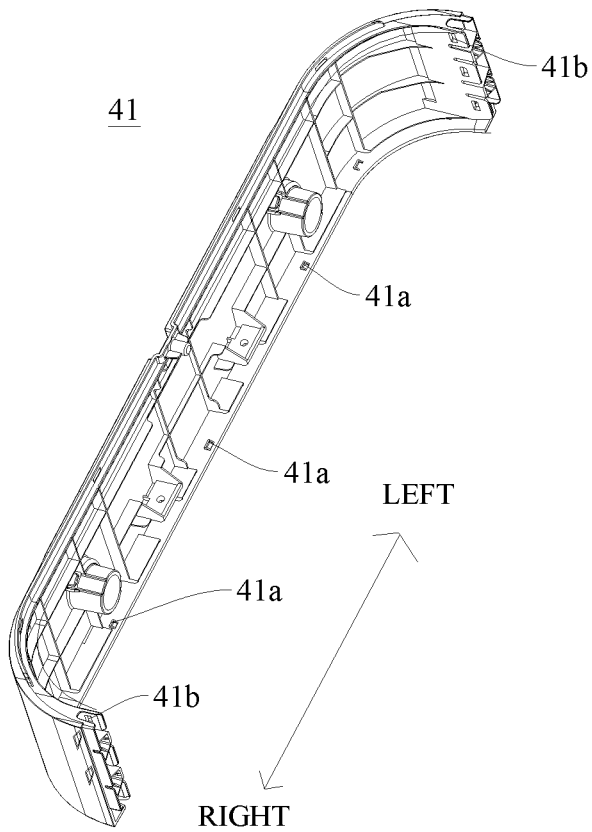
FIG. 6 is a schematic view of a bottom cover for the rear grill assembly for the box fan in FIG. 2.

In some examples of the present disclosure, with reference to FIGS. 4 and 6, a rear edge of the bottom cover 41 can be provided with a bottom-cover rear edge snap connecting portion 41a, and the rear grill 10 can be provided with a first rear-grill snap connecting portion 11 snap-fitted with the bottom-cover rear edge snap connecting portion 41a. As shown in FIG. 4, the first rear-grill snap connecting portion 11 can be a through hole or a blind hole. As shown in FIG. 6, the bottom-cover rear edge snap connecting portion 41a can be a snap, and the snap extends into the first rear-grill snap connecting portion 11 so as to mount the bottom cover 41 to the rear grill 10.

Figure 7:
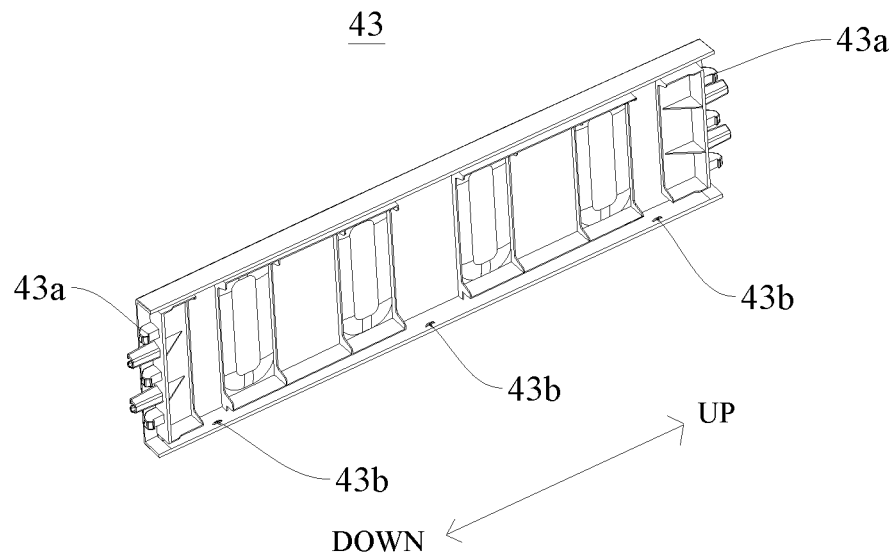
FIG. 7 is a schematic view of a lateral plate for the rear grill assembly for the box fan in FIG. 2.

In one embodiment, as shown in FIG. 7, an end portion of the lateral plate 43 can be provided with a lateral-plate end snap connecting portion 43a, and a rear side edge of the lateral plate 43 can be provided with a lateral-plate rear edge snap connecting portion 43b. As shown in FIG. 4, the rear grill 10 can also be provided with a second rear-grill snap connecting portion 12, and the second rear-grill snap connecting portion 12 is snap-fitted with the lateral-plate rear edge snap connecting portion 43b. The lateral-plate rear edge snap connecting portion 43b can be configured as a snap and the second rear-grill snap connecting portion 12 can be configured as a through hole or a blind hole, the snap extends into the second rear-grill snap connecting portion 12 so as to mount the lateral plate 43 to the rear grill 10.

As shown in FIGS. 2 and 6, two end portions of the bottom cover 41 are separately provided with a bottom-cover end snap connecting portion 41b, and the bottom-cover end snap connecting portion 41b is snap-fitted with the corresponding lateral-plate end snap connecting portion 43a. A rear edge of the top cover 42 is provided with a top-cover rear edge snap connecting portion, and an end portion of the top cover 42 is provided with a top-cover end snap connecting portion 42a. The rear grill 10 is provided with a third rear-grill snap connecting portion 13, the third rear-grill snap connecting portion 13 is snap-fitted with the top-cover rear edge snap connecting portion, and the top-cover end snap connecting portion 42a is snap-fitted with the corresponding lateral-plate end snap connecting portion 43a. The third rear-grill snap connecting portion 13 can be configured as a through hole or a blind hole, the top-cover rear edge snap connecting portion can configured as a snap, the snap extends into the third rear-grill snap connecting portion 13 so as to mount the top cover 42 to the rear grill 10. It should be understood that, each lateral plate 43 has two lateral-plate end snap connecting portions 43a, and one of the two lateral-plate end snap connecting portions 43a is used for snap-fitting with the bottom-cover end snap connecting portion 41b, and the other one is used for snap-fitting with the top-cover end snap connecting portion 42a. As shown in FIG. 6, the bottom-cover end snap connecting portion 41b can be a through hole or a blind hole, the lateral-plate end snap connecting portion 43a can be a snap, the snap extends into the bottom-cover end snap connecting portion 41b so as to mount the lateral plate 43 to the bottom cover 41.

Therefore, according to one embodiment of the present disclosure, the top cover 42 and the bottom cover 41 can have the same structure, the two lateral plates 43 can have the same structure, and the rear edge snap connecting portions of the top cover 42, the bottom cover 43 and the two lateral plates 43 are each a snap, the first rear-grill snap connecting portion 11, the second rear-grill snap connecting portion 12 and the third rear-grill snap connecting portion 13 on the rear grill 10 each can be a through hole or a blind hole, such that the difficulty of production of the rear grill 10, the top cover 42, the bottom cover 41 and the two lateral plates 43 can be reduced at least to a certain extent, moreover the time for the installation between the rear grill 10 and the frame 40 can be shortened, thereby improving the efficiency of installation of the rear grill assembly 100.

In one embodiment, as shown in FIG. 1, the two lateral plates 43 can be arranged at left and right sides of the electric motor support 20 and symmetrical about the electric motor support 20, and the top cover 42 and the bottom cover 41 can be arranged at upper and lower sides of electric motor support 20 and symmetrical about the electric motor support 20. Therefore, the rear grill assembly 100 has a simple and reliable structure, and the respective components are arranged reasonably.

In one embodiment, as shown in FIG. 2, the lateral plate 3 can be a flat plate, a main body of each of the top cover 42 and the bottom cover 41 is a flat plate, and an end portion of each of the top cover 42 and the bottom cover 41 is an arc structure used for connecting with the lateral plate 43. By configuring the end portions of the top cover 42 and the bottom cover 41 as the arc structures, on one hand, the end portion of the frame 40 can match the end portion of the rear grill 10, on the other hand, the top cover 42 can be conveniently mounted to the two lateral plates 43 and the bottom cover 41 can be conveniently mounted to the two lateral plates 43.

In one embodiment, the electric motor support 20 can be a metal part, and the rear grill 10 and the frame 40 each can be a plastic part. Thus, the rear grill assembly 100 constituted by the parts of the above materials has low weight and high structural strength, and the electric motor support 20 can support the electric motor 60 better, thereby ensuring the reliability of operation of the electric motor 60.

In one embodiment, the top cover 42 and/or the bottom cover 41 can be provided with a limiting plate, and the end portion of the electric motor support 20 extends into the rear of the limiting plate, the limiting plate and the electric motor support 20 are both provided with a threaded hole, a screw in the rear grill assembly 100 passes through the threaded holes of the limiting plate and the electric motor support 20. It should be understood that, the limiting plate can be disposed on the top cover 42, or the limiting plate can be disposed on the bottom cover 41, or two limiting plates are provided, and the two limiting plates can be disposed on the top cover 42 and the bottom cover 41 respectively. By arranging the limiting plate, the reliability of the electric motor support 20 that is mounted to the rear grill 10 can be improved. In addition, the screw passes through the threaded holes of the limiting plate and the electric motor support 20, so as to enhance the reliability of connection between the electric motor support 20 and the limiting plate, thereby improving the stability of the electric motor support 20 that is mounted to the rear grill assembly 100.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

What is claimed is:

1. A rear grill assembly for a box fan comprising:
a rear grill;
a plurality of positioning structures;
a snap structure;
an electric motor support located on the rear grill through the plurality of positioning structures; and
a frame arranged at a peripheral edge of the rear grill through the snap structure, and comprising a bottom cover, a top cover and two lateral plates connected between the bottom cover and the top cover;
wherein the top cover and/or the bottom cover is provided with a limiting plate, and an end portion of the electric motor support extends into a rear of the limiting plate;
wherein each of the limiting plate and the electric motor support is provided with a threaded hole, a screw in the rear grill assembly passes through the threaded holes of the limiting plate and the electric motor support.

2. The rear grill assembly for the box fan according to claim 1, wherein the electric motor support comprises: a plurality of support bodies in a strip shape, each support body is located with respect to the rear grill through one of the plurality of positioning structures.

3. The rear grill assembly for the box fan according to claim 2, wherein two support bodies are provided and arranged in parallel to each other, each support body extends upwards to an upper edge of the rear grill and downwards to a lower edge of the rear grill, an electric motor of the box fan is configured to be fixed between the two support bodies.

4. The rear grill assembly for the box fan according to claim 2, further comprising an electric motor fireproof hood, the electric motor fireproof hood being fixed to the electric motor support, and the electric motor of the box fan is configured to be disposed in the electric motor fireproof hood.

5. The rear grill assembly for the box fan according to claim 1, wherein the plurality of positioning structures are spaced from each other in a length direction of the electric motor support, and each of the plurality of positioning structure comprises a positioning hole and a positioning pillar which are fitted with each other.

6. The rear grill assembly for the box fan according to claim 1, wherein a rear edge of the bottom cover is provided with a bottom-cover rear edge snap connecting portion, and the rear grill is provided with a first rear-grill snap connecting portion snap-fitted with the bottom-cover rear edge snap connecting portion.

7. The rear grill assembly for the box fan according to claim 1, wherein an end portion of each lateral plate is provided with a lateral-plate end snap connecting portion, and a rear side edge of each lateral plate is provided with a lateral-plate rear edge snap connecting portion;
each of two end portions of the bottom cover is provided with a bottom-cover end snap connecting portion, and the bottom-cover end snap connecting portion is snap-fitted with the corresponding lateral-plate end snap connecting portion; and
the rear grill is further provided with a second rear-grill snap connecting portion, and the second rear-grill snap connecting portion is snap-fitted with the lateral-plate rear edge snap connecting portion.

8. The rear grill assembly for the box fan according to claim 1, wherein a rear edge of the top cover is provided with a top-cover rear edge snap connecting portion, and an end portion of the top cover is provided with a top-cover end snap connecting portion, the rear grill is provided with a third rear-grill snap connecting portion, the third rear-grill snap connecting portion is snap-fitted with the top-cover rear edge snap connecting portion, and the top-cover end snap connecting portion is snap-fitted with the corresponding lateral-plate end snap connecting portion.

9. The rear grill assembly for the box fan according to claim 1, wherein the electric motor support is a metal part, and the rear grill and the frame both are a plastic part.

\* \* \* \* \*